No. 777,235. PATENTED DEC. 13, 1904.
L. ABRAHAM.
PARCEL CONVEYER.
APPLICATION FILED MAY 17, 1904.
NO MODEL.
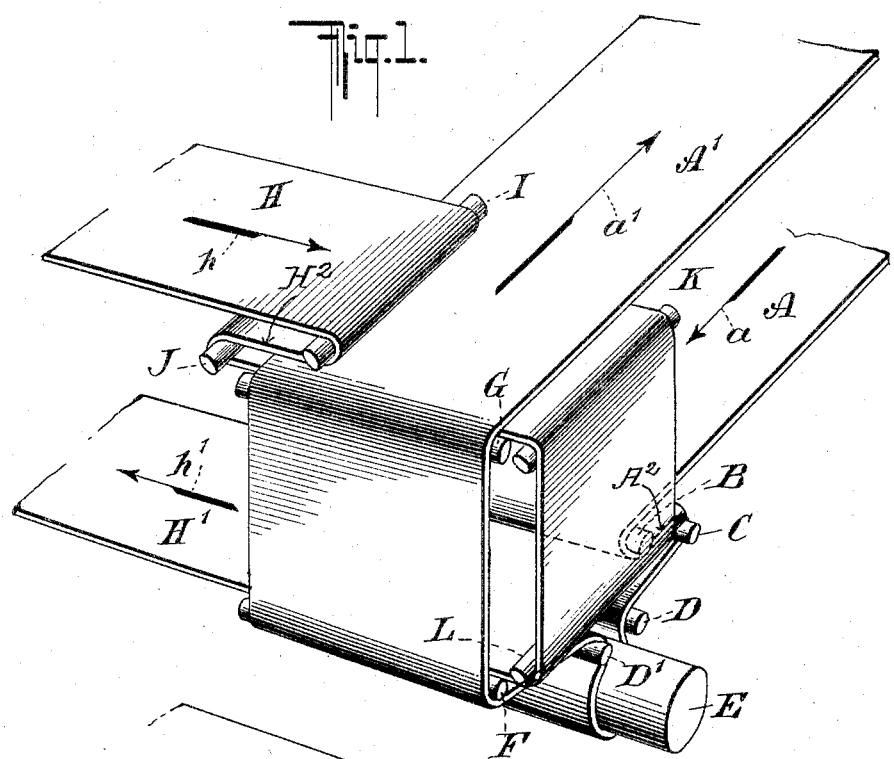
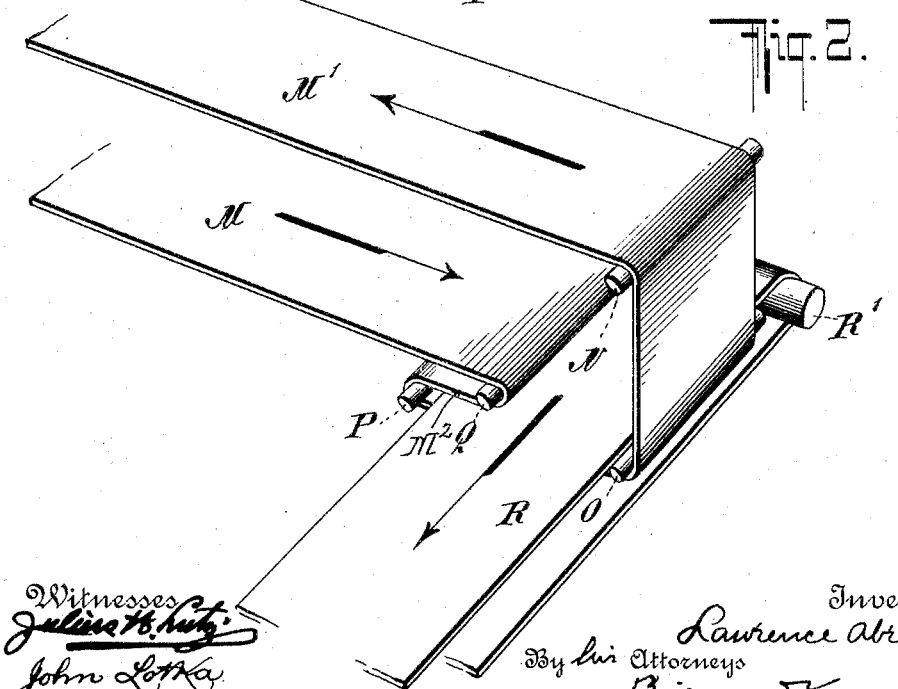
Witnesses
Inventor
Lawrence Abraham
By his Attorneys No. 777,235.

Patented December 13, 1904.

UNITED STATES PATENT OFFICE.

LAWRENCE ABRAHAM, OF NEW YORK, N. Y.

PARCEL-CONVEYER.

SPECIFICATION forming part of Letters Patent No. 777,235, dated December 13, 1904.

Application filed May 17, 1904. Serial No. 208,363. (No model.)

*To all whom it may concern:*

Be it known that I, LAWRENCE ABRAHAM, a citizen of the United States, residing in the borough of Brooklyn, county of Kings, city and State of New York, have invented certain new and useful Improvements in Parcel-Conveyers, of which the following is a specification.

My invention relates to conveyers for carrying parcels from one part of a building to another—as, for instance, from a salesroom to a shipping-room—and has for its object to provide a simple and efficient mechanism, so that both sides of the belt may be used for conveying purposes.

The particulars of my invention will be fully described hereinafter and the features of novelty pointed out in the appended claims.

Reference is to be had to the accompanying drawings, in which—

Figure 1 is a fragmentary perspective view of a conveyer with my invention applied thereto, and Fig. 2 is a similar view illustrating a different arrangement.

In Fig. 1 the belt A travels in a horizontal direction over a supporting or guide roller B, suitably mounted on stationary framework, (not shown,) and then in the reverse direction over a guide-roller C, also suitably mounted on stationary framework, thus forming a return portion $A^2$. After passing over the roller C the belt A again travels in the first-named direction and is guided by rollers D D' over a main roller E, to which power may be applied in any suitable manner for driving the conveyer. The belt A after leaving the roller D' passes over another roller F and is guided in an upward direction for some distance to another guide-roller G. After leaving this guide-roller G the belt again assumes a horizontal direction substantially parallel to the belt portion A, the belt portion A' traveling in the opposite direction to the said portion A, as shown by the arrows $a\ a'$. A belt H travels at substantially right angles to the belt A and is so arranged that it first travels in a horizontal direction over a roller I and then forms a backward loop or return portion $H^2$ over a roller J and then again in a horizontal direction underneath the belt portion A' and over a roller K. After leaving the roller K the belt H travels in a downward direction over a roller L and then again in a horizontal direction, as shown at H', substantially parallel to the belt portion H. It will be understood that the rollers B and I are placed inside of the edges of the belts H' and A', respectively, so that the belt portion A overhangs the belt portion H' and the belt portion H overhangs the belt portion A'. Thus parcels or goods may be placed on the belt portion A and will be carried in the direction indicated by the arrow $a$ and delivered to the belt portion H', traveling at substantially right angles, as indicated by arrow $h'$. In this instance the goods have been carried upon the inside surfaces of the belts. At the same time goods or parcels may be placed on the belt portion H, traveling in the opposite direction to the belt portion H', as indicated by arrow $h$, and deposited on the belt portion A', traveling in the opposite direction to the belt portion A, the outside surfaces of the belts being used in this instance. It will thus be seen that both sides of the belt being capable of use the conveyer will have double the capacity of an ordinary belt conveyer. With this arrangement it is also possible to return parcels or goods to the starting-point, if for any reason this is desired—as, for instance, a parcel delivered by the belt portion A to the belt portion H' may be returned by depositing the said parcel upon the belt portion H, to be thus delivered to the belt portion A', traveling in the opposite direction to the belt portions H' and A. It will be understood that power may be applied to the belt portions H and H' in a similar manner as described in regard to the belt portions A and A'. I desire it to be further understood that the conveyers are continuous belts and that the arrangement of the parts is or may be duplicated at the other ends of the conveyer.

In Fig. 2 I have illustrated belt portions M M' having a return portion $M^2$ similar to the belt portions A, A', and $A^2$ and traveling over similar guide-rollers N, O, P, and Q, the arrangement being the same as described with regard to Fig. 1. R is a simple belt conveyer traveling over rollers R' and driven in any suitable manner, to which the goods or parcels from the belt portion M are delivered. A chute may be substituted for the conveyer R, it being always understood that the belt portion from which the goods are to be delivered to a receiving device—such as another double conveyer, a single conveyer, or a chute—is to overhang that edge of the receiving device which is nearest to the delivery end of the belt portion from which the goods or parcels are delivered. With this arrangement there is no danger of the goods or parcels falling between the belts as they are delivered from one belt to another.

Various modifications of my invention may be made without departing from the nature of my invention.

I claim as new and desire to secure by Letters Patent—

1. The combination of a conveyer the lower run of which is provided with a return portion to form a pocket and another conveyer which passes into said pocket beneath said return portion so as to be overlapped thereby.

2. The combination of a conveyer formed with a return portion in one of its runs so as to have three adjacent substantially parallel portions at a certain point of the said run, and another conveyer disposed at an angle to the first conveyer and having a portion disposed between two of said three parallel portions and in receiving relation to the first conveyer.

3. The combination of a conveyer formed with a return portion in its upper run, and another conveyer disposed at an angle to the first and provided with a return portion in its lower run, the upper run of the second conveyer being overlapped by the return portion of the first conveyer, and the lower run of the first conveyer being overlapped by the return portion of the second conveyer.

4. The combination of a conveyer the lower run of which is provided with a return portion, and another conveyer the lower run of which passes beneath said return portion so as to be overlapped thereby.

5. The combination of two conveyers disposed at an angle to each other, the upper run of one conveyer and the lower run of the other conveyer being provided with a discharge portion overlapping the other, receiving run of the companion conveyer.

In testimony whereof I have hereunto signed my name in the presence of two subscribing witnesses.

LAWRENCE ABRAHAM.

Witnesses:
J. SCHIPPER,
JOHN A. KEHLENBECK.